United States Patent Office 2,783,229
Patented Feb. 26, 1957

2,783,229

PRODUCTION OF 2-MERCAPTO-6-METHYL-PENTHIAZOLINE

Hans Tummes, Duisburg-Meiderich, Germany, assignor to Ruhrchemie Aktiengesellschaft, Oberhausen-Holten, Germany, a corporation of Germany No Drawing. Application March 1, 1954,
Serial No. 413,458

Claims priority, application Germany March 3, 1953

3 Claims. (Cl. 260—243)

This invention relates to improvements in the production of 2-mercapto-6-methyl-penthiazoline.

2-mercapto-6-methyl-penthiazoline, which has also been designated as 2-mercapto-6-methyl-$\Delta^2$-dihydro-1,3-thiazine (see Beilstein, 4th edition, Hauptwerk, vol. 27, page 152) has the formula:

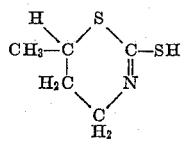

and has been produced by reacting gamma bromo butylamine hydrochloride or gamma chloro butylamine hydrochloride with carbon disulfide and a strong alkali (see A. Luchmann "Berichte der Deutschen chemischen Gesellschaft," vol. 29, page 1429 (1896)).

The gamma substituted butylamine hydrochloride, which is used as the starting product, is, however, very difficult to obtain, and its preparation from simple compounds requires numerous reaction steps.

One object of this invention is the preparation of 2-mercapto-6-methyl-penthiazoline from a readily obtainable starting product. This, and still further objects will become apparent from the following description:

It has now been found that pure 2-mercapto-6-methyl-penthiazoline may be prepared by reacting chlorinated butylamine hydrochloride in aqueous solution of carbon disulfide and an alkali.

The chlorinated n-butylamine hydrochloride used as the starting material is easily produced from n-butylamine in the following manner:

Dry HCl gas is passed into a solution consisting of 1 part n-butylamine and 15 parts carbon tetrachloride, while cooling, until the amine is completely converted into the hydrochloride. The solution is then heated until it boils and sufficient chlorine gas is passed into the boiling solution while irradiating with a mercury vapor lamp, until the chlorine absorbed by the n-butylamine hydrochloride has reached about 1 gram atom chlorine per mol. After cooling of the reaction mixture, the chlorinated n-butylamine hydrochloride results in scale-like crystals and may, after having sucked off the solvent, directly be used for the conversion into 2-mercapto-6-methyl-penthiazoline according to the invention.

In reacting the chlorinated n-butylamine hydrochloride with strong alkalis and carbon disulfide, the reactants must be brought together at low temperatures, for the chlorinated butylamine hydrochloride is converted by the alkali hydroxide solution into the free chlorinated n-butylamine which, at higher temperatures, is highly prone to intermolecular condensations and is thereby withheld from the reaction proper. It is preferable to slowly add at first the lye to the aqueous solution of the chlorinated butylamine while intensively cooling thereby maintaining a temperature of —5° to 5° C. Following this, the carbon disulfide is slowly added while cooling. Since carbon disulfide is not miscible with the aqueous reaction solution, thorough intermixing by stirring or shaking must be provided for. The intermixing may be improved by the addition of emulsifying agents.

The reaction proper which occurs while mixing should be effected between 10° and 25° C. and requires about 30–60 minutes. To obtain a high concentration of the free chlorinated butylamine required for the reaction, highly concentrated aqueous solutions of the chlorinated butylamine hydrochloride are best used. Strong alkalis, as, for example, a potassium solution or caustic soda solution having concentrations of 2–5 moles per liter are used as alkali hydroxides. The quantity of the alkali hydroxide solutions added is dependent upon the total Cl content of the chlorinated butylamine. The quantity of alkali hydroxide should be just sufficient that all of the chlorine may be combined as sodium chloride. An excess of lye should be avoided because this increases the solubility of the mercapto-penthiazoline and reduces the yield. If necessary or desired, the alkali hydroxide solutions may contain low alcohols, as, for example, methyl or ethyl alcohol.

The chlorinated butylamine hydrochloride used as a starting product in accordance with the invention represents a mixture of butylamine hydrochloride, $a$, $\beta$, $\gamma$, and $\delta$-chlorobutylamine hydrochloride and di- and polychlorobutylamine hydrochlorides.

However, only the $\gamma$-chlorobutylamine hydrochloride participates in the formation of the methyl mercapto penthiazoline as may be readily seen from the following reaction equation:

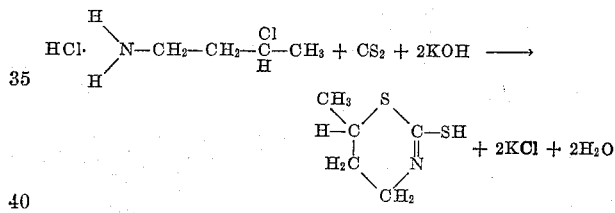

It would normally be expected that the presence of the butylamine hydrochlorides containing chlorine substitution in the $a$, $\beta$, and $\delta$-positions and the di- and polychlorobutylamine hydrochlorides would interfere with the formation of the 2-mercapto-6-methyl-penthiazoline and recovery in pure form. This is particularly true when considering that the $\beta$-chlorobutylamine hydrochloride will react with carbon disulfide in the alkali in accordance with the following equation:

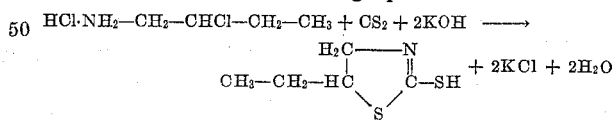

thus forming 2-mercapto-5-ethyl-thiazoline, which would make the preparation of 2-mercapto-6-methyl-penthiazoline in pure form extremely difficult.

Very surprisingly, however, it has been found that in the chlorination of the butylamine hydrochlorides, chlorine substitutions in the $a$- and $\beta$-positions only occur to a very minor extent, and that the same do not interfere with the production or recovery of the 2-mercapto-6-methyl-penthiazoline in pure form.

Further it has been found that the $\delta$-chlorobutylamine hydrochloride and the non-chlorinated butylamine hydrochloride are not capable of reacting with carbon disulfide with ring formation. The reaction in this case either stops with the formation of the xanthogenate or with the formation of chlorine-containing xanthogenates, which further gradually condense to form higher molecular weight compounds. The same products are also formed from the di- and polychlorobutylamine hydrochlorides.

These products do not interfere with the formation of the 2-mercapto-6-methyl-penthiazoline or prevent its recovery in pure form. The 2-mercapto-6-methyl-penthiazoline crystallizes from the water and may easily be isolated from the reaction mixture.

Depending upon the degree of chlorination of the chlorinated butylamine hydrochloride, the yield of pure 2-mercapto-6-methyl-penthiazoline ranges from 20–30% by weight of the starting product.

The 2-mercapto-6-methyl-penthiazoline may be used as pickle inhibitor (see "Angewandte Chemie," vol. 66, pages 661–670 (1952)). It may also be used as vulcanization accelerator and as insecticide.

The following example is given by way of illustration and not limitation:

Example 48.8 grams n-butylamine were dissolved in 500 cc. carbon tetrachloride in a three-necked reaction flask. While cooling, the solution was neutralized by introducing gaseous hydrogen chloride. The reaction solution was boiled at a reflux condenser, irradiated with a mercury vapor lamp and gaseous chlorine was introduced into the boiling solution at a constant flow rate of 40 liters/hour of chlorine. By continuously sampling, the progressive absorption of chlorine by the n-butylamine hydrochloride could be followed by comparing the ionically combined chlorine with the chlorine which was not ionically combined. After 8 hours, the product had absorbed 1 gram atom chlorine per mole amine hydrochloride. While cooling, a substance mixture of chlorinated butylamine hydrochloride crystallized from the reaction mixture and was obtained as a colorless, scale-like product after having sucked off the solvent.

A solution of 100 cc. water and 72 grams of the n-butylamine hydrochloride chlorinated in the manner described above was carefully mixed, while adequately cooling, with 200 cc. 5-normal caustic soda solution in such a manner that the temperature did not exceed 0° C. Following this, 36 grams carbon disulfide were added. The reaction mixture was vigorously shaken for 30–60 minutes while maintaining a temperature of 10–25° C. by correspondingly cooling, until a crystalline precipitation of the reaction product could be observed. The reaction solution was allowed to stand for 12 hours at room temperature, and then suction-filtered. The crystal slurry obtained was at first recrystallized from alcohol and then from water. This resulted in 17.5 grams pure 2-mercapto-6-methyl-penthiazoline in a coarsely crystalline form having a melting point of 130–131° C.

Instead of caustic soda solution, a potassium solution may be used in carrying out the experiment of the example.

I claim:

1. Process for the production of 2-mercapto-6-methyl-penthiazoline, which comprises reacting a mixed chlorination product obtained from the C-chlorination of n-butylamine with carbon disulfide and an alkali, and recovering the 2-mercapto-6-methyl-penthiazoline formed.

2. Process according to claim 1, in which said reaction is effected in an aqueous solution.

3. Process according to claim 1, in which said reaction is effected at a temperature of about −5° C. up to 25° C.

References Cited in the file of this patent

UNITED STATES PATENTS 2,086,186    Messer    July 6, 1937

OTHER REFERENCES

Luchmann: "Berichte" (1896), vol. 29, pp. 1420–33.